United States Patent Office 3,736,272
Patented May 29, 1973

3,736,272
LOW-DENSITY, FREEZE-RESISTANT POLYURETHANE FOAMS
Paul R. Mosso, Natrona Heights, and James F. Foote, Sarver, Pa., assignors to PPG Industries, Inc., Pittsburgh, Pa.
No Drawing. Filed Nov. 1, 1971, Ser. No. 194,525
Int. Cl. C08g 22/44
U.S. Cl. 260—2.5 BB                         19 Claims

ABSTRACT OF THE DISCLOSURE

This invention relates to low density polyurethane foams which have good freeze resistance with good K factor and K factor stability, even at a low packing factor. These results were obtained by adding aluminum (hydroxystearate) salts to the polyurethane foam formulation. The invention also relates to stable compatible premixes of aminic polyols and the aluminum (hydroxystearate) salts which have good aging characteristics and can be utilized to form the polyurethane foams of the invention.

STATE OF THE ART

In recent years, demand has grown for polyurethane foams of low density, that is, below about 2 pounds per cubic foot, while retaining freeze resistance and K factor. Numerous attempts have been made to add modifiers to polyurethane foam formulations to achieve the combination of low densities, freeze resistance and K factor. Frequent problems have been encountered by the use of additives and the additives tend to separate, demonstrate poor stability or detract from one or more of the foam properties.

DESCRIPTION OF THE INVENTION

It has now been found that the incorporation of aluminum(hydroxystearate) salts into polyurethane foam formulations allows the production of low density polyurethane foams with exceptional properties, even at densities below about 1.5 pounds per cubic foot.

It has further been found that compatible premixes of aminic polyols and aluminum(hydroxystearates) can be formed which have good aging characteristics and which can be utilized to produce low density polyurethane foams derived from these premixes which are freeze-resistant while demonstrating good K factor and good K factor stability.

Numerous other closely related materials such as aluminum stearates, calcium stearates, zinc palmitates and others fail to provide stable premixes and/or freeze-resistant foams.

The polyurethane foams of the invention have substantially improved characteristics such as freeze resistance and improved K factor, among others, which properties are especially noticable at low densities, for example, at densities below about 2.0, and especially desirable are foams having open flow densities as low as about 0.9 pound per cubic foot and having molded densities of about 1.2 pounds per cubic foot, and preferably between about 1.4 pounds per cubic foot and about 1.6 pounds per cubic foot.

These properties are obtained from a polyurethane foam having dispersed therein an aluminum(hydroxystearate) salt, preferably dissolved in an aminic polyol; a polyether polyol, preferably a sucrose polyether polyol; and an organic polyisocyanate.

In one aspect of the invention, it has been found that stable premixes of the aminic polyol and the aluminum hydroxy stearate salt may be formed, which premixes greatly enhance the practical utility of the use of the aluminum hydroxy stearate additive.

The aluminum(hydroxystearate) salt may be any aluminum(hydroxystearate) salt, for example, aluminum (monohydroxystearate), aluminum (dihydroxystearate), aluminum(trihydroxystearate), or mixtures thereof.

The presently preferred salt is aluminum(dihydroxystearate) corresponding to the formula:

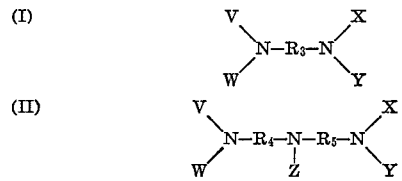

The aminic polyols used to prepare the premixes are aminic polyols having the structure of polyols derived by reacting and primary, secondary, or tertiary amine containing at least four active amine hydrogen atoms with propylene oxide.

Preferably, such starting amines correspond to the formulas:

(I)
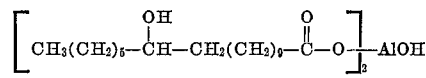

(II)

where V, W, X, Y and Z are selected from —H, —R₁ or

In the above formulas, $R_1$, $R_2$, $R_3$, $R_4$ and $R_5$ are aliphatic hydrocarbon groups, preferably containing 1 to 10 carbon atoms.

Thus, if ethylene-diamine is reacted with propylene oxide, a material with the structure:

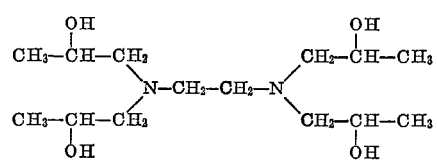

results, which is available commercially under the trade name of "Qudrol."

The reaction of diethylenetriamine with propylene oxide produces a material which is described below:

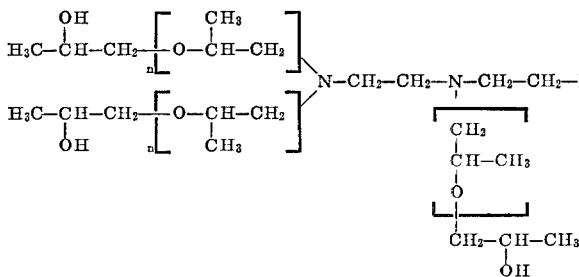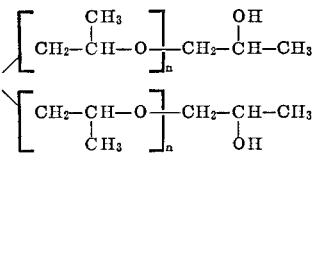

wherein *n* is a number which may be from 0 to about 5. The polyols containing tertiary amino groups and having hydroxyl numbers in a range between about 200 and about 800 are preferred.

The presently preferred aminic polyol is an aminic polyol derived from diethylene triamine and propylene oxide and having a hydroxyl value between about 350 and about 550 and preferably about 475.

The stable premixes are prepared by incorporating between about 5 percent and about 25 percent and preferably about 10 percent to about 18 percent of the aluminum(hydroxystearate) salt, preferably aluminum(dihydroxystearate), by weight of the premix, into the aminic polyol.

In order to prepare a stable premix, it is desirable to dissolve or intimately disperse the aluminum(hydroxystearate) salt in the aminic polyol. This may be achieved by heating the mixture of aluminum (hydroxystearate) and aminic polyol to a temperature at or preferably above the melting point of the aluminum(hydroxystearate) salt for a time sufficient to dissolve or intimately disperse the aluminum(hydroxystearate) salt in the aminic polyol.

The polyol component of the polyurethane foam of this invention may be any polyether polyol which has utility in forming polyurethane foams having a functionality between about 5 and about 8, preferably between about 6 and about 8. Preferably, the polyols consist essentially of carbon, hydrogen and oxygen and preferably comprise oxyalkylation products of a saccharide or glucoside such as sucrose, fructose, glucose or sorbitol containing at least usually 6 to 8 hydroxyl groups per molecule. Presently, sucrose, because of its availability and low cost, constitutes the preferred starting polyol for oxyalkylation. The oxyalkylation products usually have a hydroxyl number in a range of about 150 to about 700. Preferably, the oxyalkylation of glucoside or saccharide is effected with an oxirane compound of relatively low molecular weight containing but a single oxirane ring and being represented by ethylene oxide, propylene oxide and butylene oxide. Butylene oxide, if used, may be either the 1,2 or the 2,3 oxide isomer. Obviously, mixtures of the 1,2 and 2,3 butylene oxide isomers could also be used in effecting the reaction. Styrene oxide may also be used to satisfy all of, or a part of, the requirements for oxirane compound.

The alkylene oxide or oxirane compound may be employed in a proportion in excess of equivalency with respect to the hydroxyl groups of the saccharide compound which is being oxyalkylated. For example, in the instance of sucrose, the ratio of alkylene oxide preferably is in a range of about 10 to about 30 moles per mole of sucrose, so that at least a part of the ether chains formed will contain a plurality of oxyalkyl units. The preparation of such compounds is disclosed in detail in U.S. Pat. 3,153,002, issued Oct. 13, 1964. The method consists essentially of dissolving the sucrose in a small amount of water, e.g., about 5 percent to about 17 percent of water, in a pressure container, such as an autoclave, and contacting the resultant solution with the alkylene oxide under pressure until a desired degree of oxyalkylation has been obtained. The reaction may be catalyzed with a base, such as sodium hydroxide, sodium carbonate or sodium acetate, the amount thereof being within a range of about 1 percent to about 10 percent. When oxyalkylation is completed, the water and any other volatile components present may be removed by evaporation.

The polyether polyol products of the references are characterized by viscosities in a range of about 2,000 to about 400,000 centipoises, hydroxyl values in a range of about 250 to about 750, and molecular weights of about 700 to about 1800.

A second method of oxyalkylating sucrose is disclosed in U.S. Pat. 3,085,085, issued Apr. 9, 1963. According to the method disclosed in the latter, the sucrose is initially dissolved in a small amount of water, as disclosed in the first-mentioned patent, and is then partially oxyalkylated, e.g., to the extent that about 6 moles of alkylene oxide are reacted with the hydroxyls of the sucrose, the water is then removed and further oxyalkylation is conducted to obtain side chains with a plurality of ether linkages, each chain being terminated by a hydroxyl group.

In the instance of the preferred polyols, namely, the oxyalkylation products of sucrose, the polyether polyols may be represented by the formula as set forth in U.S. Pat. No. 3,153,002, wherein the molecule contains about 10 to about 25 moles of alkylene oxide, i.e., ethylene oxide, propylene oxide or 1,2-butylene oxide-derived groups. The sucrose polyether polyols will normally have a hydroxyl number in the range of about 200 to about 600.

Similar techniques may be employed in the oxyalkylation of other saccharides, such as fructose, glucose or sorbitol, or mixtures thereof such as are represented in invert sugar, etc. Oxyalkylated starch or oxyalkylated cellulose may also be used. Mixtures of sucrose and glucosides such as methyl glucoside, may be used as the polyol component in the foams of this invention.

The polyurethane foams of this invention are generally prepared by reacting approximately one equivalent of polyol with one equivalent of organic polyisocyanate. The organic polyisocyanate may be virtually any organic polyisocyanate having a functionality between about 2.1 and about 2.6. These polyisocyanates are generally polymeric polyisocyanates including the following:

Crude diphenylmethane-4,4'-diisocyanate, commonly referred to as crude MDI, having a functionality of about 2.5 to 2.6. Furthermore, although solid organic polyisocyanates can be utilized in the instant invention by melting them prior to reaction with the other foam-forming ingredients, it is preferred that liquid organic polyisocyanates be utilized.

Another organic polyisocyanate particularly useful is crude toluene diisocyanate, commonly referred to as crude TDI, containing about 85 percent TDI and about 15 percent polymeric isocyanate and having a functionality of about 2.1 and an NCO of 108 (Nacconate 4040).

Other isocyanates include undistilled crude TDI (Hylene TRF) with a viscosity of 500–1500 centipoises, a specific gravity of 1.26±0.03 and a total acidity of .01–.05 percent; and Mondur MT40, a crude polymeric isocyanate with an NCO value of 104–106, a viscosity of circa 50, which is approximately 60 percent MDI and 40 percent TDI with a functionality of 2.3.

Polymethylenepolyphenyl isocyanate, referred to as PAPI, having an isocyanate functionality greater than about 2.4 is also useful.

The relative amount of organic polyisocyanate utilized in polyurethane foam formulations is susceptible to variation over a substantial range. Usually the isocyanate component is employed in an amount which provides approximately one reactive isocyanato group for each reactive hydrogen of the other component, which is conventionally a polyol, polyamine or similar reactive hydrogen-containing material. However, some of the organic polyisocyanates tend to evaporate and it may be desirable to compensate for this loss. A range of about ½ equivalent to about 2 equivalents of organic polyisocyanate per equivalent of polyol component in the final material is ordinarily used, but smaller or larger amounts can be utilized. Preferably the foam formulation has an isocyanate index of between about 95 and about 130 and most preferably in an order of about 105.

In addition to the reactive components listed above, it has been found that the inclusion of water in rigid foam formulations based upon the novel polyols disclosed herein may give certain beneficial effects. Water, of course, will promote cellulation by reaction with diisocyanato groups to produce carbon dioxide, however, in addition to causing cellulation, it has been found to improve to some extent the dimensional stability of certain rigid polyurethane foams produced according to the teachings of this invention.

Catalysts which promote the polyurethane linkage reactions in the final curing of the polyurethane resins are conventionally added. These include tertiary amines of hydroxyl amines, organic salts of tin, and the like. The following constituted a partial list of such catalysts: tetramethylenediamine (anhydrous) (TMEDA); tetramethyl guanidine (TMG), tetramethyl - 1,3 - butanediamine (TMBDA); triethylenediamine of the formula:

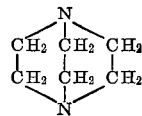

known as Dabco, dimethylethanolamine (DMEA); tin esters, such as stannous oleate, stannous octoate, dibutyl tin dilaurate, and the like.

Many other catalysts may be substituted for those listed above, if desired. The amount of catalyst used may be in the range of about 0.05 percent to about 5 percent or more by weight based upon the total of the polyols employed. Mixtures of the above and/or other catalysts may also be utilized.

Also, to increase or optimize the rate of curing or crosslinking, to provide forms of optimum quality, it is frequently desirable to add to the foam formulation a portion of a polyol such as an amine polyol which is catalytic and/or relatively more rapidly reactive than the non-amine polyols described above. Examples of such polyols include those described in U.S. Pat. No. 3,094,434.

To impart a foamed or cellular structure to the blended polyol-polyisocyanate mixture, a suitable gassing agent or system of gassing agents must be added or produced in situ. The liquid but relatively volatile hydrocarbons, such as the following perhalocarbons containing 1, 2 or even up to 4 carbon atoms, are especialy desirable for the purpose. These include the following: $CCl_3F$; $CCl_2F_2$; $C_2Cl_2F_4$; $CHCl_2F$; $CClF_3$; $CHClF_2$. The halocarbons having 1 and 2 carbon atoms are preferred, and of these, tri- chloromonofluoromethane and dichloro-difluoromethane are particularly useful in commercial preparations. These are added as liquids in quantities of about 10 percent or less to about 20 percent or more, by weight of the total resin to the blended polyol-polyisocyanate mixtures, or to one or more components thereof, and are substantially volatilized in the liquid mixture to effect cellulation. Subsequently, the mixture cures to a hardened, cellular state.

Although the halocarbons are especially desirable as blowing agents when exceptional insulative properties are desired, other blowing agents, such as water, carbon dioxide, and the like, can be utilized in this invention.

A specially preferred blowing system which produces optimum low temperature dimensional stability is the combination of a chlorofluorocarbon described above and water. The systems comprise about 0.5 percent to about 1.5 percent water and about 12 percent to about 18 percent chlorofluorocarbon by weight, based on the total formulation, or, stated differently, about 3 percent to about 13 percent and preferably about 4 percent to about 9 percent water based on the weight of the chlorofluorocarbon blowing agent.

In order to obtain relatively uniform distribution of the various components of the liquid system and to achieve proper cellulation, an emulsifier and/or surfactant may be incorporated into the mixture. These materials are physical in their effect and are not always necessary, especially if denser foams are desired. Many hundreds of these are available as commercial products. Some of these are listed in the publication Detergents and Emulsifiers—Up to Date 1960, published by John W. McCutcheon, Inc., 475 Fifth Avenue, New York, N.Y.

Examples of surfactants which may be used include the so-called Pluronics, which have been described as being condensates of ethylene oxide with a hydrophobic base formed by condensing propylene oxide with propylene glycol. These are of a molecular weight in a range of about 2000 to about 8000 and are ascribed the structure.

Another class of surfactants comprises the so-called Tetronics, which are formed by the addition of propylene oxide to ethylene diamine, followed by the addition of ethylene oxide. These compounds have been ascribed the structure:

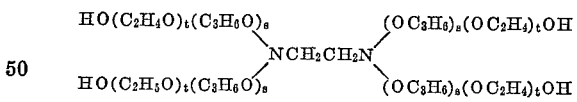

Another valuable clas of surfactants comprises the so-called Tweens, which are described as the monoesters of higher fatty acids, represented by lauric acid, stearic acid, and oleic acid, and polyoxyethylene sorbitan.

Another of the more satisfactory surfactants which has been found very effectively to maintain the cell structure in the foaming and curing of polyurethane resins comprises soluble, liquid derivatives of the silicone. One such product is of the approximate structure:

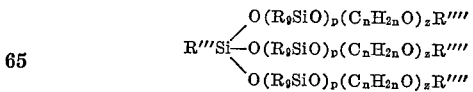

in which $R'''$ and $R''''$ are monovalent hydrocarbon radicals, while $R_9$ is a divalent hydrocarbon radical; $p$, $q$, and $r$ are integers equal to at least 1 and may be considerably higher, e.g., 2, 3, 4, 5, 6, or a higher number up to about 20; $n$ is a whole number from about 2 to about 4; and $z$ is an integer equal to at least 5 and may be higher, e.g., 6, 7, 8, 9, 10, or even higher, up to about 25. One such material is sold as Dow Corning–199. Still another highly useful silicone base surfactant comprises the so-called silicone L-521, represented by the following formula:

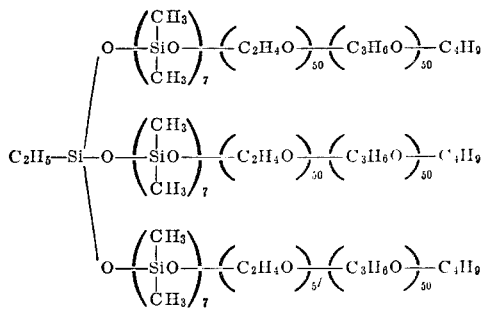

Other surfactants, especially the liquid or soluble nonionic ones, are also useful. The surfactants may be employed in amounts within a range of about 0.1 to about 3 percent by weight based upon the mixture of polyol components and the organic polyisocyanate component.

The amount of aluminum(hydroxystearate)salt added to the foams of the invention may vary considerably. The amount added is that about which effectively produces freeze resistance in the foam at a density below about 2.0 pounds per cubic foot.

When the aluminum(hydroxystearate)salt is added as a stable solution or intimate dispersion in the amine polyol as described above. Quantities in the range of about 3 to about 8 percent by weight and preferablly about 4 to about 5 percent by weight of the salt based on the total polyol masterbatch are employed. The polyol mastermatch being that which is generally employed in the art, that is, the combination of active hydrogen components, blowing agent and of adjuvants usually present such as surfactants and catalysts.

When the aluminum(hydroxystearate)salt is nearly dispersed into the foam formulation without the benefit of the stable aminic polyol dispersion, lesser amounts are effective and generally amounts between about 0.05 percent and about 1.0 percent and preferably 0.1 percent to about 0.4 percent by weight based on masterbatch are employed.

The following examples illustrate in detail the preparation of the novel polyhydroxy resins and polyurethane foams thereof of this invention, but the invention is not to be construed as being limited solely thereto.

Example I

A stable premix was prepared by heating 85 parts of an aminic polyol which is the reaction product of one mole of diethylenetriamine and 8.5 moles of propylene oxide (viscosity 10,500 centipoises, hydroxyl value 477) and 15 parts of aluminum di(hydroxystearate) at a temperature of 325° F. for one-half hour.

A masterbatch was prepared by admixing:

| | Parts by weight |
|---|---|
| Sucrose polyol (1 mole sucrose/0.4 mole diethylenetriamine, 14.5 moles propylene oxide/4 moles ethylene oxide, OH 475) | 28.5 |
| Aminic polyol (1 mole ethylene diamine/2 moles propylene oxide/2 moles ethylene oxide) | 20.0 |
| Premix (above) | 11.0 |
| Silicone surfactant | 1.0 |
| Dibutyl tin dilaurate | 0.1 |
| Water | 0.8 |
| Trichlorofluoromethane | 47.0 |

A polyurethane foam was prepared by admixing the above masterbatch with 105 parts of crude toluene diisocyanate (NCO 108, functionality 2.1).

A two-inch molded panel had the following properties (1.58 pounds/cubic foot density):

| | |
|---|---|
| $DK_1$ | 0.111 |
| $DK_{10\ days}$ [1] | 0.111 |
| $DK_{20\ days}$ [1] | 0.116 |
| $DK_{40\ days}$ [1] | 0.128 |
| $DK_{80\ days}$ [1] | 0.140 |

[1] 120° F./75 percent relative humidity aging.

This panel had an excellent freeze thaw rating (24 hours at −20° F.).

Foams prepared from the premix aged for 65 days at room temperature showed similar freeze test results. Similar results are likewise obtained from the same premix aged 45 days at 117° F. (premix slightly hazy).

Example II

A stable premix was prepared by heating 35 parts of an aminic polyol which is the reaction product of one mole of diethylenetriamine (DETA) and 8.5 moles of propylene oxide (viscosity 10,500 centipoises; hydroxyl value 477) and 10 parts of aluminum di(hydroxystearate) at a temperature of 325° F. for ½ hour. The premix had good aging stability.

A masterbatch was prepared by admixing:

| | Parts by weight |
|---|---|
| Sucrose polyol (1 mole sucrose/14.8 moles propylene oxide, OH 400) | 15.0 |
| Aminic polyol (1 mole DETA/8.5 moles propylene oxide) | 7.0 |
| Aminic polyol (1 mole ethylene diamine/2 moles propylene oxide/2 moles ethylene oxide) | 25.0 |
| Water | 2.0 |
| Silicone surfactant | 1.0 |
| Premix (above) | 25.0 |
| Trichloromonofluoromethane | 42.0 |

A polyurethane foam was prepared by admixing the above masterbatch with 83 parts of crude toluene diisocyanate (NCO 108, functionality 2.1). The foam, in 2-inch panels, had a minimum fill density of 1.06 pounds/cubic foot.

FOAM DATA
(2-inch panel)

| | Not freeze tested | Freeze tested 24 hrs. at −20° F. |
|---|---|---|
| Density: | | |
| Molded | 1.29 | 1.30 |
| Core | 1.19 | 1.19 |
| Percent closed cells: | | |
| Top | 88.6 | 89.6 |
| Bottom | 86.3 | 87.6 |
| Compressive strength, p.s.i. at yield: | | |
| Parallel: | | |
| Top | 7.1 | 7.6 |
| Bottom | 13.8 | 14.5 |
| Perpendicular: | | |
| Top | 9.1 | 9.3 |
| Bottom | 8.1 | 8.6 |
| Water vapor transmission (perms/inch) | 2.18 | 2.44 |
| DK factor (days): | | |
| $DK_1$ | 0.125 | 0.132 |
| $DK_{10}$ [a] | 0.133 | 0.145 |
| $DK_{30}$ [a] | 0.137 | 0.147 |
| $DK_{60}$ [a] | 0.141 | 0.144 |
| $DK_{183}$ [a] | 0.156 | 0.167 |

[a] Aged at 120° F./75 percent relative humidity.

In a manner similar to the examples, other polyols, isocyanates, aluminum(hydroxystearate)salts and adjuvants within the scope of the above disclosure may be employed to achieve similar results.

According to the provisions of the patent statutes, there is described above the invention and what are now considered to be its best embodiments. However, within the scope of the appended claims, it is to be understood that the invention can be practiced otherwise than as specifically described.

We claim:
1. A cellular rigid polyurethane resin having a density below two pounds per cubic foot displaying improved freeze resistance prepared from a mixture comprising:
 (A) a polyether polyol having a functionality of at least 5,
 (B) a freeze-resistance improving amount of an aluminum(hydroxystearate) salt;
 (C) an organic polyisocyanate having a functionality between about 2.1 and about 2.6, and
 (D) a blowing agent,
the ratio of isocyanate to polyol being about one-half to about two equivalents of polyisocyante per equivalent of polyol.

2. A cellular polyurethane as in claim 1 wherein the ratio of polyol to isocyanate is approximately 1:1.

3. A cellular polyurethane as in claim 1 wherein the mixture contains (E) an aminic polyol.

4. A cellular polyurethane as in claim 3 wherein the organic polyisocyanate is a mixture containing toluene diisocyanate.

5. A cellular polyurethane as in claim 4 wherein (B) is aluminum di(hydroxystearate).

6. A stable premix comprising:
 (A) an aminic polyol which is the reaction product of an amine having at least four active amine hydrogens and propylene oxide, and
 (B) a stably dissolved amount of an aluminum(hydroxystearate)salt.

7. A stable premix as in claim 6 wherein (A) is the reaction product of diethylene triamine and propylene oxide.

8. A stable premix as in claim 7 wherein the reaction product has a hydroxyl value between about 425 and about 500.

9. A stable premix as in claim 8 wherein (B) is aluminum di(hydroxystearate).

10. A stable premix as in claim 7 wherein (B) is present in an amount of about 5 percent to about 25 percent by weight of (A) and (B).

11. A cellular rigid polyurethane foam as in claim 1 wherein the mixture comprises:
 (A) a polyether polyol having a functionality of at least 5;
 (B) a freeze-resistant improving amount of a stably dissolved premix comprising:
  (1) an aminic polyol which is the reaction product of an amine having at least four active amine hydrogens and propylene oxide;
  amine hydrogens and propylene oxide; and
  (2) a stably dissolved amount of an aluminum(hydroxystearate) salt;
 (C) an organic polyisocyanate having a functionality between about 2.1 and about 2.6; and
 (D) a blowing agent,
the ratio of isocyanate-to-polyol being between about one-half and about two equivalents of polyisocyanate per equivalent of polyol.

12. A cellular polyurethane as in claim 11 wherein (B)(1) is the reaction product of diethylene triamine and propylene oxide.

13. A cellular polyurethane as in claim 12 wherein (B)(1) has a hydroxyl value between about 425 and about 500.

14. A cellular rigid polyurethane foam as in claim 11 wherein the mixture comprises:
 (A) a polyether polyol having a functionality of at least 5;
 (B) a freeze-resistant improving amount of a stably dispersed premix of:
  (1) an aminic polyol which is the reaction product of an amine having at least four active hydrogens and propylene oxide; and
  (2) a stably dissolved amount of an aluminum(hydroxystearate) salt;
 (C) an aminic polyol in addition to that present in (B)(1);
 (D) an organic polyisocyanate which is a mixture containing toluene diisocyanate; and
 (E) a blowing agent.

15. A cellular polyurethane as in claim 14 wherein (B)(1) is the reaction product of diethylene triamine and propylene oxide.

16. A cellular polyurethane as in claim 15 wherein (B)(1) has a hydroxyl value between about 425 and about 500.

17. A cellular polyurethane foam as in claim 16 wherein the aluminum(hydroxystearate) salt is present in an amount of about 3 percent to about 6 percent based on the total weight of the masterbatch.

18. A cellular polyurethane foam as in claim 17 wherein the aluminum(hydroxystearate) is aluminum di(hydroxystearate).

19. A cellular polyurethane foam as in claim 18 wherein the ratio of polyol to isocyanate is approximately 1:1.

References Cited
FOREIGN PATENTS
1,025,088  4/1966  Great Britain ____ 260—2.5 AB DONALD E. CZAJA, Primary Examiner M. J. WELSH, Assistant Examiner U.S. Cl. X.R.

252—182; 260—2.5 AL, 2.5 AP, 2.5 AQ, 18 TN